United States Patent [19]

Yasukuni et al.

[11] 4,159,864
[45] Jul. 3, 1979

[54] APERTURE STOP CONTROL DEVICE FOR A ZOOM LENS SYSTEM

[75] Inventors: Mitsuo Yasukuni; Takashi Iida, both of Sakai; Hiroshi Kiten, Mino, all of Japan

[73] Assignee: Minolta Camera Kabushiki Kaisha, Osaka, Japan

[21] Appl. No.: 871,820

[22] Filed: Jan. 24, 1978

[30] Foreign Application Priority Data

Jan. 25, 1977 [JP] Japan ................................ 52/7444

[51] Int. Cl.² .............................................. G02B 15/14
[52] U.S. Cl. ................................... 350/184; 350/205; 354/196; 354/271
[58] Field of Search ...................... 350/184, 186, 205; 354/44, 196, 271

[56] References Cited

U.S. PATENT DOCUMENTS

| 3,889,282 | 6/1975 | Hashimoto | 354/196 |
| 4,043,642 | 8/1977 | Hirose et al. | 350/184 |

*Primary Examiner*—Paul A. Sacher
*Attorney, Agent, or Firm*—Harold L. Jackson; Stanley R. Jones; Joseph W. Price

[57] ABSTRACT

An aperture stop control device for a zoom lens system includes a variable aperture stop, a first sensor for determining the diameter of the aperture stop and providing a first electrical signal representative of the diameter of the aperture stop means and a second sensor for generating a second electrical signal indicative of a designated F number. A signal generator provides a third electrical signal indicative of the focal length of the zoom lens system. A computing circuit computes an output electrical signal as a function of the second and third electrical signals to control the diameter of the aperture stop for automatically maintaining a designated F number during a zooming operation.

10 Claims, 6 Drawing Figures

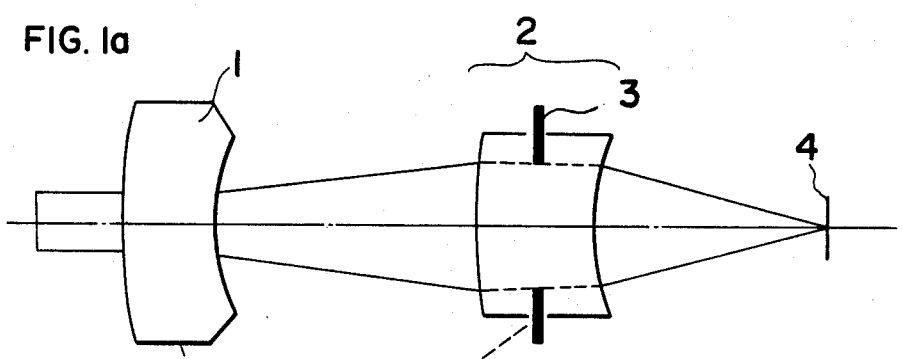
FIG. 1a
FIG. 1b
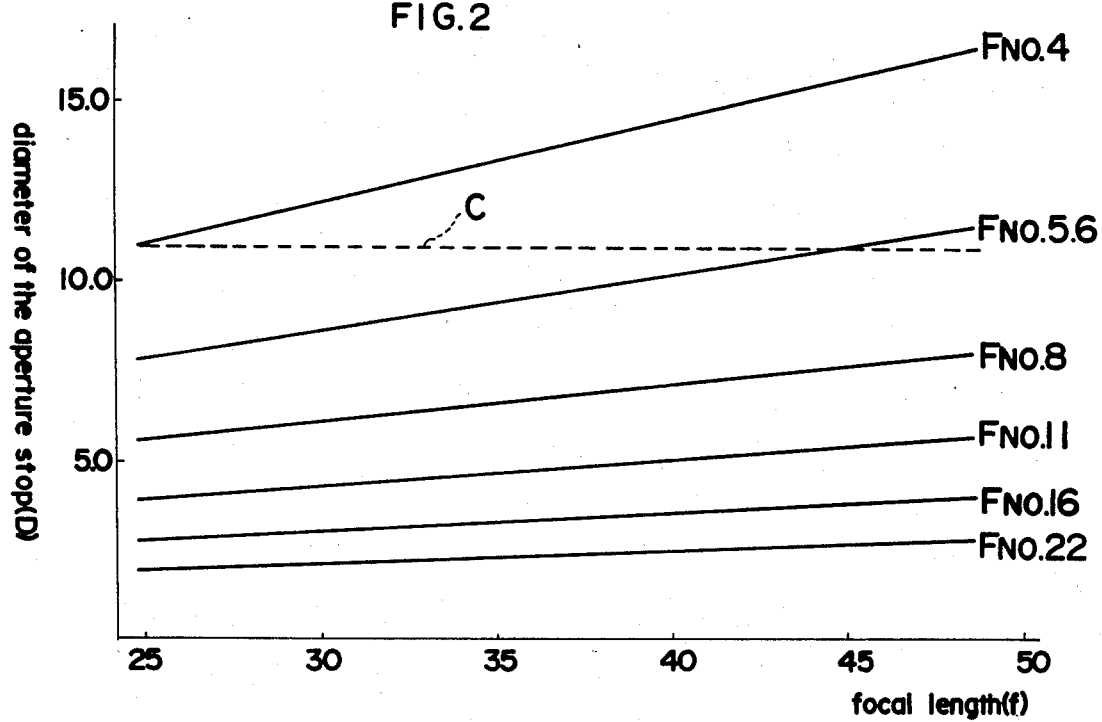
FIG. 2

APERTURE STOP CONTROL DEVICE FOR A ZOOM LENS SYSTEM

BACKGROUND OF THE INVENTION

1. Field of the Invention

The present invention relates to an aperture stop control device for a lens, and more particularly to an automatic aperture stop control system for a zoom lens system wherein any variation in F number accompanying a zooming operation will be automatically adjusted to a desired value.

2. Brief Description of the Prior Art

Two-group zoom lens systems are well-known in the photography field. In a two-group zoom lens system which has a front lens group of a negative refractive power and a rear lens group of a positive refractive power, the focal length of the system is usually variably adjusted by changing the air space formed between the front and rear lens groups. An aperture stop is usually positioned in the rear lens group and is, accordingly, moved along the optical axis upon the movement of the rear lens group relative to the front lens group during a zooming operation. This movement of the aperture stop along the optical axis causes a variation in the effective F number if the mechanical diameter of the aperture stop is fixedly held constant during the zooming operation. Therefore, the mechanical diameter of the aperture stop should be variably compensated by a predetermined value in relation to the variation in the focal length for effectively maintaining a designated F number.

In general, a cam mechanism is required for controlling the diameter of the aperture stop of a zoom lens system. The cam can provide a necessary adjustment of the aperture stop to realize a designated F number in accordance with the movement of a manually operable ring which is rotatably mounted around the lens barrel and carries the F number indications.

U.S. Pat. No. 3,889,282 discloses a device for variably compensating the mechanical diameter of the aperture stop in relation to any variation of the focal length in the zoom lens system of the above-mentioned type. However, this compensation is achieved by means of another cam mechanism which adds additional complexity, weight, etc.

U.S. Pat. No. 4,043,642 is of interest since it discloses the introduction of electric control means into a lens barrel mechanism. However, this disclosure relates to a zoom lens system having a variator lens group and a compensator lens group, and more specifically to a device for controlling the movement of the compensator lens group for a zooming operation.

A Japanese patent application has been laid open to public inspection under No. 51-45527 and is of interest in that it discloses an electric control device for an aperture stop in a zoom lens system. The Japanese patent application, teaches a combination of a first potentiometer for setting an F number, an aperture stop mechanism, a second potentiometer for detecting the diameter of the aperture stop and means for driving the aperture stop mechanism until the output of the second potentiometer coincides with that of the first potentiometer. The output of the second potentiometer is shifted by a predetermined value by means of switches to accommodate any change in a relay lens of the zoom lens system to shift the variable range of the focal length. The number of switches are increased if the number of exchangeable relay lenses is increased. The Japanese patent application neither relates to a zoom lens system in which a variation in effection F number accompanies a zooming operation, nor does it disclose any means for compensating the mechanical diameter of the aperture stop in relation to the zooming operation.

SUMMARY OF THE INVENTION

An object of the present invention is to provide a device for controlling the aperture stop of a zoom lens system to accurately realize a designated F number in spite of any variation of the focal length.

Another object of the present invention is to provide a device for controlling the aperture stop without any cam mechanism which requires complexity in construction and dimensional accuracy in design and production.

Still another object of the present invention is to provide a device for controlling the aperture stop suitable for two-group zoom lens system.

The aperture stop control device of the present invention includes an aperture diameter signal generator to monitor the condition of the aperture and to generate a first electrical signal. An F number signal generator can be manually set to designate a desired reference or second electrical signal. Finally, a focal length signal generator monitors the actual relative position of the rear lens group and generates a third electrical signal representative of that position. A computing circuit is capable of deriving an output reference signal, D, from the input of the F number signal generator, second electrical signal, and the input of the focal length signal generator, third electrical signal, as follows;

$$D = A \cdot 1/F_{no} \cdot F$$

wherein A is a constant selected in accordance with the specific structure of the zoom lens system incorporating the present invention, $F_{no}$ is the F number and f is the focal length.

The output reference signal, D, can be applied to a comparator such as a differential amplifier which also receives the first electrical signal representative of the actual open diameter of the aperture. If the input signals are balanced they nullify and the aperture setting remains the same. If, however, the input signals provide a difference the resulting output from the differential amplifier is applied to a driving circuit such as an operational amplifier to, in turn, drive a motor which varies the opening of the aperture diameter until the system reaches an equilibrium position.

In an alternative embodiment, the aperture stop can be of an electrochromic assembly that is divided into a predetermined number of elements that are responsive to a digital signal for transmitting or blocking the transmission of light.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 1a and 1b are schematic cross-sectional views of a two-group zoom lens system in its shortest and longest focal length settings, respectively;

FIG. 2 is a graph showing a relationship between the mechanical diameter of the aperture stop, the F number and the focal length of a two-group zoom lens system;

DETAILED DESCRIPTION OF THE PREFERRED EMBODIMENTS

Figure 3:
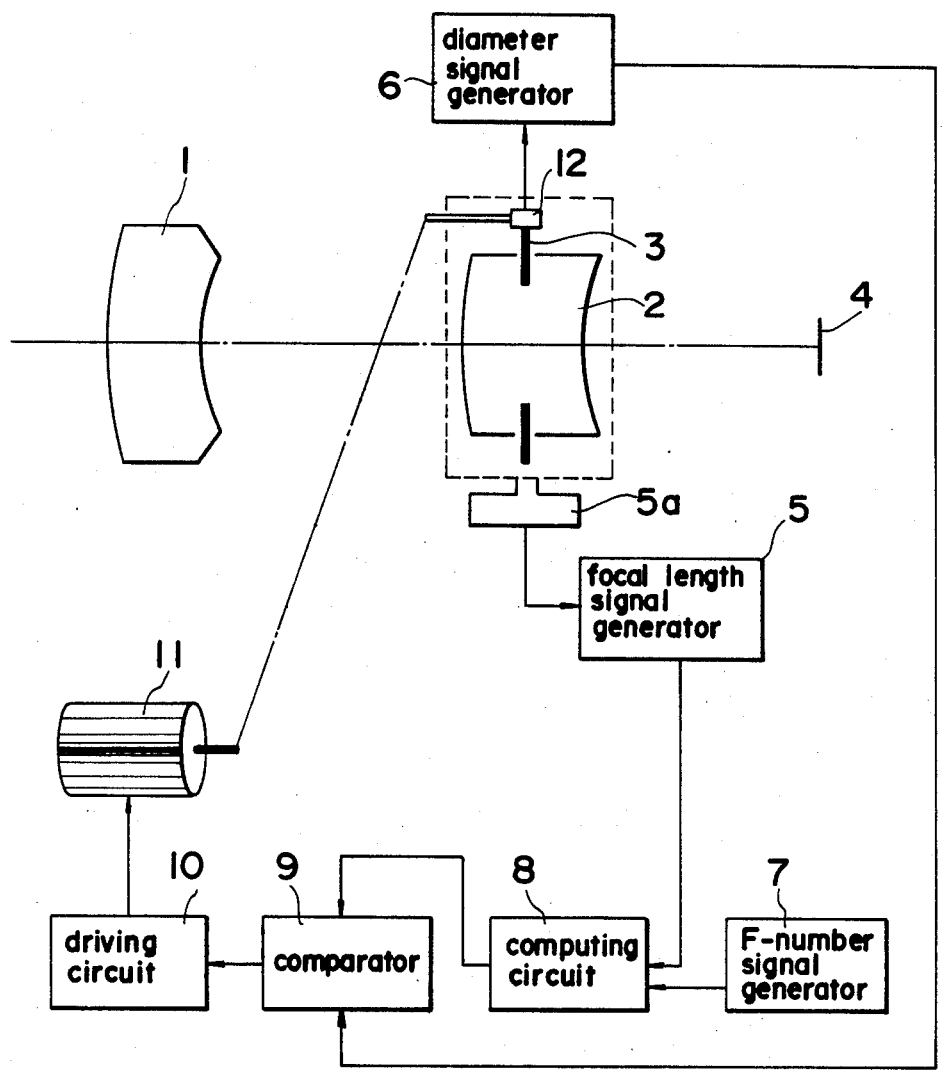
FIG. 3 is a block diagram of a first embodiment of the present invention.

This invention will hereinafter be described in detail with reference to the accompanying drawings in which FIGS. 1a and 1b diagrammatically disclose the physical shift or movement during zooming, of a two-group zoom lens system relating to the present invention. Thus, FIG. 1a shows the shortest focal length setting and FIG. 1b shows the longest focal length setting. In these figures, (1) is a front lens group having a negative refractive power. Reference numeral (3) indicates an aperture stop which is shifted together with the rear lens group (2) of a positive refractive power as a unit along the optical axis on zooming, while (4) designates an image plane.

FIG. 2 is a graphical representation of the relationship of focal length, f, and the aperture stop diameter D for giving a desired F number, with the F number being indicated as a parameter. The values given in FIG. 2 are pertinent to an embodiment in which the overall refractive power of the front lens group (1) is -0.0260166, the refractive power of the rear group (2) is 0.0295838, the axial distance between the front and rear lens groups at the shortest focal length setting is 47.966 and the axial distance therebetween at the longest focal length setting is 22.154. In the above embodiment, the overall focal length of the entire system varies between 24.7 and 48.5 to provide a wide angle to telephoto zoom lens. As will be apparent from this figure of the drawing, the aperture stop diameter D, is a function of F number, $F_{no}$, and the overall focal length, f, of the lens system, and is generally represented by the equation D=F (F, F no). Assuming that zooming is effected with a fixed aperture-stop diameter when the F number is 4 at the shortest focal length setting, the F number at the longest focal lens setting would be no more than F/5.6 as indicated by broken line C. Therefore, to maintain the F number at F/4, the aperture stop diameter will have to be varied during zooming along the line F number 4 in FIG. 2. Similarly, when the desired F number is F/5.6, F/8 or any other number, the aperture stop diameter will have to be varied along the line F number 5.6, F number 8 or other as the case may be. The necessity of varying the rate of change in aperture stop diameter according to a desired F number will be understood from the fact that, in FIG. 2, the slopes of the lines vary with the different F numbers.

FIG. 3 is a block diagram showing a first embodiment of the aperture control means according to this invention. In this figure of the drawing, (1) and (2) are the front lens group and the rear lens group, respectively, of the above two-group zoom lens system. Reference numeral (3) indicates an aperture stop and an image plane is indicated at (4). A focal length signal generator (5) is adapted to detect the position of the rear lens group (2), as the latter is shifted on zooming, by way of a monitor or detector (5a) and generates a signal corresponding to the focal length. A diameter signal generator (6) is adapted to detect the diameter of aperture stop (3) and generates an output signal corresponding to the detected diameter. Indicated at (7) is an F number signal generator, by which the desired F number is designated, to generate a signal corresponding to the F number setting. A computing circuit (8) is adapted to carry out a computation according to the above mentioned function D=F (f, F no) based on the signal from said focal length signal generator (5) and the signal from the F number signal generator (7). An example of the computation achieved by the computing circuit is:

$$D = A \cdot 1/F_{no} \cdot F$$

whereas A is a constant selected in accordance with detailed construction data of a zoom lens system to which the present invention is applied.

Specifically, the aperture stop diameter for providing the desired F number is determined from the focal length and the F number in accordance with the characteristic shown in FIG. 2 and the aperture diameter control signal is generated. The specific monitor or detector does not form a part of the present invention and accordingly, need not be described in detail, reference is made, however, to U.S. Pat. No. 4,043,642 to disclose monitors and the subject matter of it is hereby incorporated by reference.

Reference numeral (9) indicates a comparator such as a differential amplifier adapted to compare the signal from the diameter signal generator (6) with the output signal from the computing circuit (8) and a driving circuit (10) such as an operational amplifier is used to drive the aperture stop (3) according to the output signal from the comparator (9), with a motor (11).

These units constitute a servo means which locks the aperture stop (3) when the signal from (6) and the signal from (8) have agreed and balanced. The rotational output of the motor (11) is transmitted to an aperture stop driving gear (12) to directly drive the aperture assembly.

In the above arrangement, the diameter signal generator (6), the F number signal generator (7), the focal length signal generator (5), may include conventional potentiometers or the like so as to generate each signal as an analog quantity such as a voltage and, thereby, to carry out the computation, comparison and other processing analogically. Alternatively, said members (5), (6) and (7) may be comprised of encoders or the like so as to digitally carry out the computation, comparison and other processing. In either method, the individual electrical elements are well-known to those skilled in this art and need not be further described.

In the above arrangement, the signal corresponding to the focal length setting and the signal corresponding to the F number setting on zooming are computed by the computing circuit (8) and, accordingly, the diameter control signal corresponding to the aperture stop diameter for providing the desired F number is generated. Since the diameter signal generator (6) has already generated the signal corresponding to the actual aperture stop diameter, the aperture stop (3) is driven under the control of comparator (9) until the signal from the generator (6) coincides and is balanced with the signal from the computing circuit (8), thus permitting the required aperture stop control. When the focal length and the F number or either one of them is altered, the diameter control signal from circuit (8) is also altered, with the result that the aperture stop diameter is also varied. In this manner, the aperture stop is always controlled to provide a diameter giving the desired F number.

Figure 4:
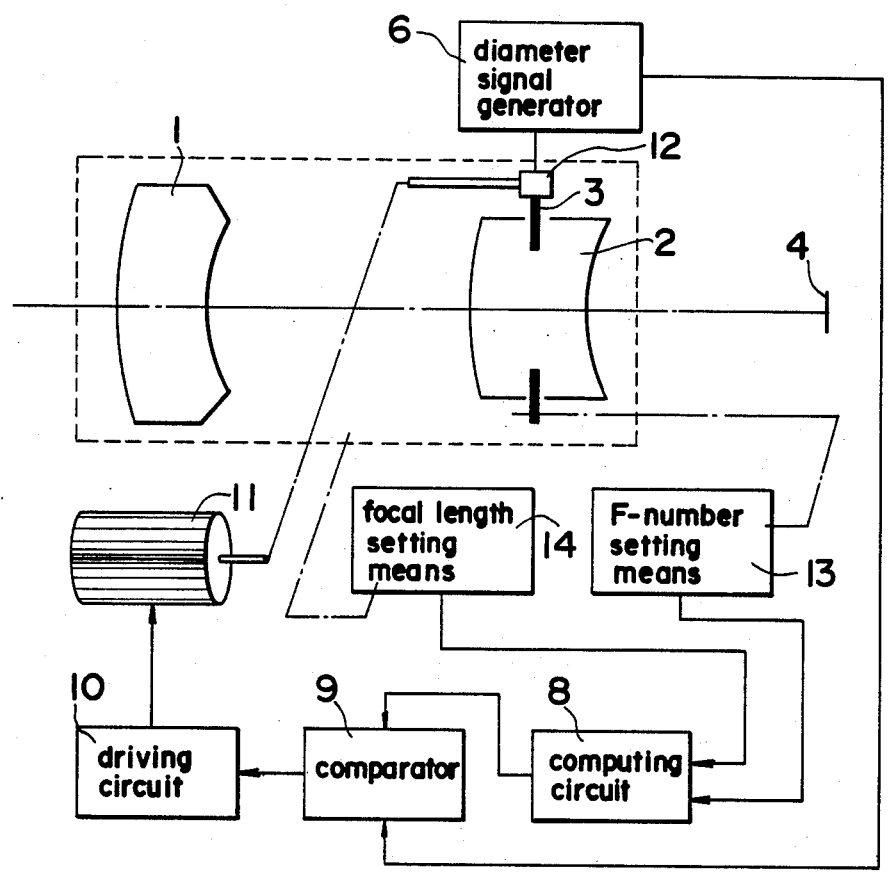
FIG. 4 is a block diagram of a second embodiment of the present invention.

FIG. 4 is a block diagram showing another embodiment of this invention, in which like numerals designate the corresponding like parts of the embodiment illustrated in FIG. 3. In this embodiment, the aperture stop (3) may not only be driven by a motor (11) but also be manually set by means of an aperture setting means (13). The aperture setting means (13) is constructed and adapted to set the aperture stop diameter to a given value solely based on the F number setting irrespective of the focal length, for example to a value that will provide the desired F number at an intermediate focal length setting. It will, of course, be readily understood that, in the above instance, both at the shortest and at the longest focal length, the F number is deviant from the desired value. The aperture setting means (13) functions as an F number signal generator as well and, thus, transmits the signal corresponding to the desired F number setting to the computing circuit (8). On the other hand, a focal length setting means (14) including a focal length setting ring, etc. is operatively associated with a zooming mechanism and, at the same time, functions also as a focal length signal generator, thus transmitting the signal corresponding to the focal length to the computing circuit (8). In other respects, the construction of this embodiment is similar to that of the embodiment illustrated in FIG. 3 and the aperture stop control functions are also the same as those in the preceding embodiment of FIG. 3. Since, in this embodiment, the aperture stop diameter is previously set to an approximately correct value by manual setting of the aperture setting means (13), the amount of drive required by the motor (11) is minimized and further the aperture stop may be manually set even when the circuitry or the motor fails to function on account of an exhausted power supply.

As will be apparent from the above example, the aperture control means according to this invention can be employed for a fine aperture stop adjustment or correction.

Figure 5:
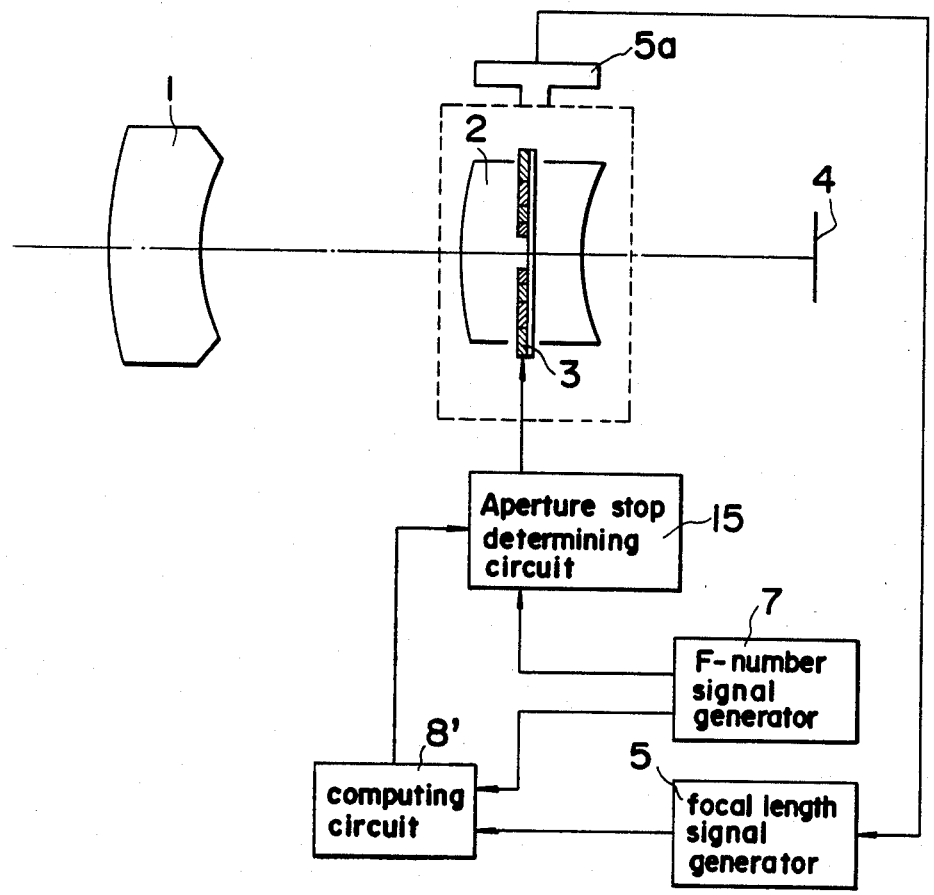
FIG. 5 is a block diagram of a third embodiment of the present invention.

FIG. 5 is a block diagram showing still another embodiment of this invention. In this embodiment, the aperture stop (3) is comprised of electro-optical light control elements such as an Electrochromic Device which is concentrically divided into a predetermined number of segments or elements and is controlled by a digital signal from a control circuit (15). The initial control signal from control circuit (15) opacifies the pertinent electro-optical light control element or elements at the aperture stop (3) in accordance with the signal from F number setting means (7) for setting the desired F number. This control signal causes the aperture stop diameter of aperture stop (3) to be set at a value determined by the desired F number as represented by the signal from F number setting means and the longest focal length setting of the lens.

This function of the control circuit (15) can be accomplished in a well-known manner by an analog to digital encoder that generates a digital code representing the F number setting as dictated by the signal from F number setting means (7). The analog to digital encoder is required if the F number setting means (7) and the focal length generator (5) generate analog signals. The digital signals are supplied to a standard digital decoder that generates the binary signals required to specify the appropriate segments in the aperture stop (3).

The computing circuit (8') computes a correction signal using the signal from the F number signal generator (7) and the signal from the focal length signal generator (5) and transmits a digital signal indicating the number of stops that must be stopped down from the aperture stop diameter at the longest focal length setting to obtain the desired F number at the particular focal length setting. This stop-down correction signal is fed to a control circuit (15) to be added to the signal from (7) and, thereby, varies the signal from the control circuit (15) to the aperture stop (3) by the directed number of stops. If the signals from F number means (7) and focal length generator (5) are analog a well-known analog to digital encoder would be required. The aperture stop control circuit (15) receives the digital signal from the computing circuit (8) and the encoded digital signal from the F number means (7). The encoded digital signal from F number means (7) represents the diameter of the aperture at the largest focal length. The digital signal from the computing circuit (8) represents difference between the diameter of the aperture for the actual focal length and the diameter represented by the signal from F number means (7) for the longest focal length setting. Accordingly, the digital code from the computing circuit (8) is supplied as a supplement to the digital decoder in control circuit (15), causing the decoder to generate the binary signal required to opacify the segments in aperture stop (3) that provide the exact diameter of aperture for the actual focal length. This automatically maintains the F number over a range of focal lengths.

As can be seen from the above embodiment, the computing circuit in this invention is adapted to compute the aperture stop diameter correction signal and produce an output so that the aperture stop diameter will be controlled according to this aperture diameter control signal. The computation involved in the embodiment of FIG. 5 is easier than in the embodiments illustrated in FIGS. 3 and 4.

As can be readily appreciated, it is possible to deviate from the above embodiments of the present invention and will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. An aperture stop control device for a zoom lens system comprising;
    an aperture stop assembly having a variable aperture stop diameter;
    means for generating a second electrical signal representative of a predetermined F number;
    means for generating a third electrical signal representative of the focal length of the zoom lens system;
    means for electrically computing a first electrical signal as a function of the second and third electrical signals, and
    means for controlling the diameter of the aperture stop in response to the first electrical signal to realize the predetermined F number despite any variation in the focal length of the zoom lens system.

2. The invention of claim 1 wherein the controlling means includes means detecting the diameter of the aperture stop to generate a fourth electrical signal representative of the actual aperture diameter, and means for driving the aperture stop assembly to vary the diameter thereof until the fourth electrical signal is brought into a predetermined relation to the first electrical signal.

3. The invention of claim 2 further comprising a lens group movable for zooming operation, wherein the third electrical signal generating means further includes means for detecting the position of the lens group to generate the third electrical signal.

4. The invention of claim 3, wherein the zoom lens system is of a two-group type having front and rear lens groups, the aperture stop assembly being located in the rear group and the movable lens group corresponding to one of the front and rear lens groups.

5. The invention of claim 1 further comprising means for setting a focal length of the lens system and means for setting the F number, wherein the focal length setting means combines the third electrical signal generating means and the F number setting means combines the second electrical signal generating means.

6. The invention of claim 1, wherein the aperture stop assembly is composed of an electronic device which changes its light transmission characteristic under electrical control, and the means for controlling the diameter includes an electronic circuit for controlling the electronic device in response to the first electrical signal.

7. The invention of claim 1, wherein the first electrical signal computing means comprises means for computing a compensation signal as a function of the second and third electrical signals and means for adding the compensation signal to the second electrical signal to generate the first electrical signal.

8. An aperture stop control device for a zoom lens system comprising;
   an aperture stop means capable of being electrically controlled;
   means for electrically generating an F number signal;
   means for electrically generating a focal length signal; and
   means for electrically computing the F number signal with the focal length signal to generate an electrical signal for controlling the aperture stop means despite any variation in the focal length of the zoom lens system.

9. An aperture stop control device for a zoom lens system comprising:
   an aperture stop means, the diameter of which is variable;
   means for driving the aperture stop means to vary the diameter thereof;
   means for detecting the diameter of the aperture stop means;
   means for designating an F number of the aperture stop means;
   means for setting the focal length of the zoom lens system; and
   means for electrically controlling the driving means in response to the condition of the detected diameter by the detecting means, the designated F number by the designating means and the set focal length by the setting means.

10. An automatic aperture stop control device for a zoom lens system comprising:
   an aperture stop device which changes its light transmission characteristic under electrical control;
   means for generating a first electrical signal indicative of a designated F number;
   means for generating a second electrical signal indicative of the focal length of the zoom lens system;
   means response to the first and second electrical signals for computing a signal representative of the diameter of the aperture stop for the F number and focal length designated by the first and second signal respectively; and
   means responsive to the first signal and the signal from said computing means for controlling said aperture stop device to change its light transmission characteristics, and whereby changing the focal length of the zoom lens system causes the aperture stop diameter to vary appropriately to maintain the designated F number.

* * * * *